United States Patent [19]

Kanai et al.

[11] Patent Number: 4,616,163
[45] Date of Patent: Oct. 7, 1986

[54] POSITION CONTROL SYSTEM FOR WHEELED VEHICLE

[75] Inventors: Seita Kanai; Toshimichi Tokunaga, both of Hiroshima; Somi Hibino, Gifu, all of Japan

[73] Assignees: Mazda Motor Corporation, Hiroshima; Kayaba Industry Co., Ltd., Tokyo, both of Japan

[21] Appl. No.: 523,828

[22] Filed: Aug. 15, 1983

[30] Foreign Application Priority Data

Aug. 31, 1982 [JP] Japan .................................. 57-151306
Aug. 31, 1982 [JP] Japan .................................. 57-151307

[51] Int. Cl.$^4$ ........................ G05B 5/01; B60G 21/00
[52] U.S. Cl. ..................................... 318/611; 280/703; 280/707; 280/709
[58] Field of Search ............... 318/611, 623, 624; 280/784, 787, 788, 709, 707, 703, 689, 690, 708, 112 A, DIG. 1, 6 H, 6.1, 702, 772; 180/902; 267/64.14

[56] References Cited

U.S. PATENT DOCUMENTS

| 3,391,317 | 7/1968 | Bell ........................................ 318/611 |
| 4,050,710 | 9/1977 | Flaig .................................. 280/707 X |
| 4,226,408 | 10/1980 | Tomita ............................. 280/708 X |
| 4,333,668 | 6/1982 | Hendrickson ................... 280/709 X |
| 4,361,346 | 11/1982 | Harris .............................. 280/709 X |
| 4,373,744 | 2/1983 | Glaze ................................... 280/707 |
| 4,391,452 | 7/1983 | Ohmori ........................... 280/707 X |
| 4,397,477 | 8/1983 | Harrison ............................. 280/709 |
| 4,420,167 | 12/1983 | Winblad .......................... 280/707 X |

Primary Examiner—William M. Shoop, Jr.
Assistant Examiner—Patrick C. Keane
Attorney, Agent, or Firm—Jordan and Hamburg

[57] ABSTRACT

When an unusual condition of a wheeled vehicle such as nose-diving caused by braking, squatting caused by an abrupt start or rolling caused by a turn is sensed, the damping force or the spring constant of each suspension unit, which serves as a shock absorbing unit, is temporarily increased to correct the position of the vehicle. The increased damping force or spring constant is maintained a predetermined period of time even after the unusual vehicle condition is settled, thereby preventing the vehicle body from tossing back due to the force of inertia.

14 Claims, 11 Drawing Figures

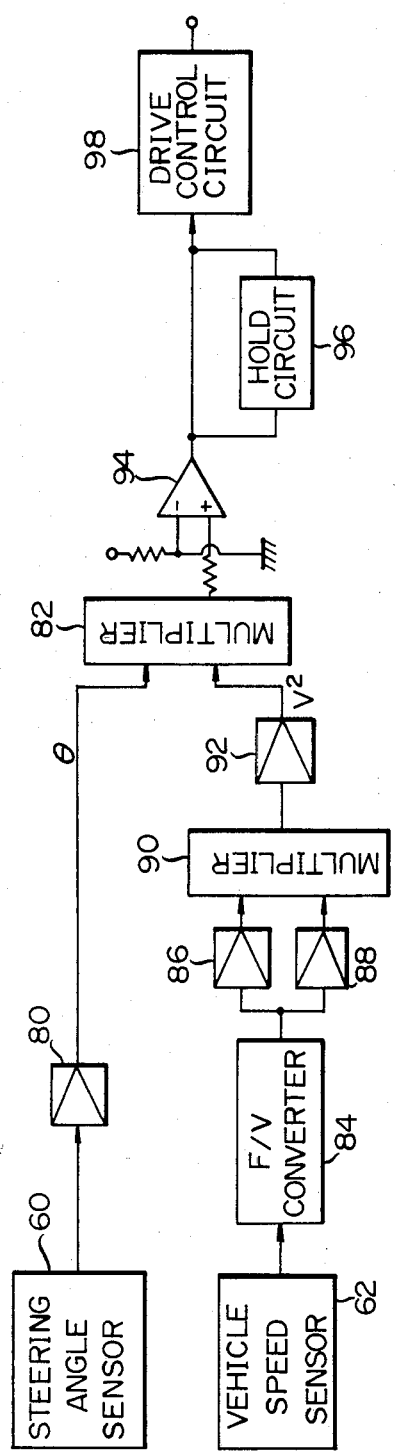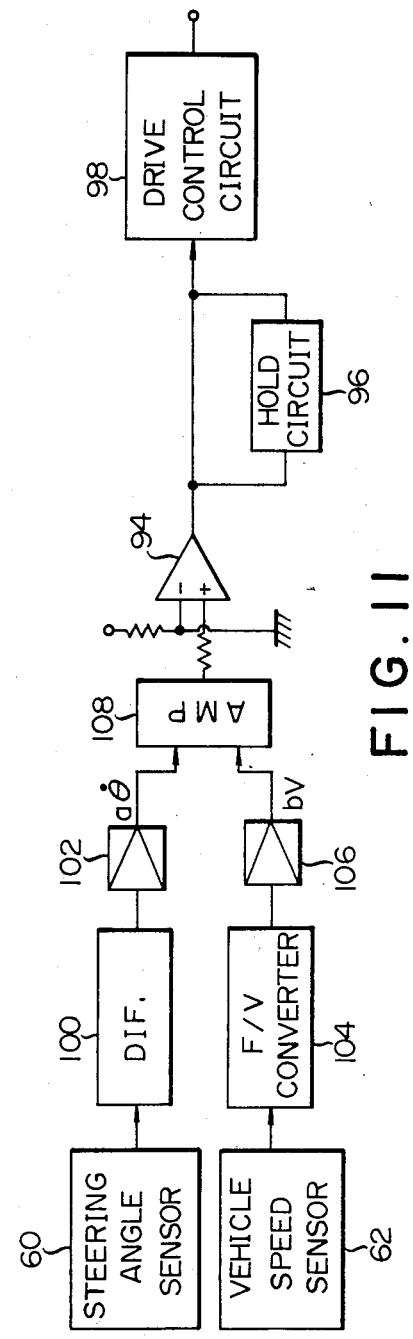
FIG. 10
FIG. 11

POSITION CONTROL SYSTEM FOR WHEELED VEHICLE

BACKGROUND OF THE INVENTION

The present invention relates to a system for controlling the position of a wheeled vehicle and, more particularly, to a position control system for maintaining a vehicle in a proper position when the vehicle is steered to make a turn, braked or abruptly started to run.

Implementations for supressing tossing or rolling of a vehicle body during a turn have been disclosed in, for example, Japanese Patent Laid Open Publication No. 56-42739/81 and Japanese Utility Model Laid Open Publication No. 56-147107/81. The disclosed type of system is constructed to temporalily increase the damping forces of hydraulic suspension units, or shock absorbing units, when the steering wheel of a vehicle is manipulated in the course of a travel at a speed higher than a given value, thereby offering occupants a comfortable ride and good operationability. This, however, suffers from a shortcoming which originates from the fact that the damping force is increased only for the duration of steering operation, that is, a condition causative of rolling, and thereafter immediately lowered to the original magnitude. For example, when the vehicle is steered to change the lane, the prior art system may prevent the vehicle body from tossing sideways but allows it to toss back in the other sidewise direction due to inertia immediately after the steering. In this respect, the prior art system is not always successful to effect the expected anti-rolling function. Further, while the vehicle runs offroad clearing a number of turns, the return of the damping force to the original small one occurs every time the vehicle is steered to the right or the left. This not only gives the occupants undesirable feeling but significantly lowers the durability of the system, because the control means associated with the suspension units has to be frequently turned on and off.

Another important consideration for insuring a comfortable ride and stability of operation is suppressing nose-diving of a vehicle body due to sudden braking or squatting due to sudden starting. However, systems heretofore proposed for such a purpose, like the anti-rolling system stated, are designed to increase the damping force of the suspension units only while the vehicle is being braked or started and, hence, incapable of eliminating tossing of the vehicle body due to inertia, which is apt to occur after nose-diving or squatting.

SUMMARY OF THE INVENTION

It is therefore an object of the present invention to provide a position control system for a wheeled vehicle which offers the vehicle improved stability and operationability during operation.

It is another object of the present invention to provide a position control system for a wheeled vehicle which is capable of positively eliminating tossing-back of the vehicle body due to inertia.

It is another object of the present invention to provide a position control system for a wheeled vehicle which is capable of fully suppressing nose-diving during a braking, squatting during an abrupt start of travel, and rolling during a turn.

A system embodying the present invention controls a position of a wheeled vehicle which includes a suspension device for damping a shock while the vehicle is running. The system includes a vehicle position sensor device for sensing a change in the position of the vehicle from usual one to unusual one and producing a signal indicative of the unusual position. A damping force regulator device regulates a shock damping force of the suspension device. The damping force regulator device is controlled by a control unit in response to the output signal of the vehicle position sensor device to increase the shock damping force exerted by the suspension device. The control effected by the control unit over the damping force regulator device is held a predetermined period of time after the vehicle regains the usual position, such that the shock damping force is maintained at the increased condition.

In accordance with the present invention, when an unusual condition of a wheeled vehicle such as nose-diving caused by braking, squatting caused by abrupt start or rolling caused by a turn is sensed, the damping force or the spring constant of each suspension unit, which serves as a shock absorbing unit, is temporarily increased to correct the position of the vehicle. The increased damping force or spring constant is maintained a predetermined period of time after the unusual vehicle condition is terminated, thereby preventing the vehicle body from tossing back due to the force of inertia.

The above and other objects, features and advantages of the present invention will become apparent from the following detailed description taken with the accompanying drawings.

BRIEF DESCRIPTION OF THE DRAWINGS

FIGS. 10 and 11 are block diagrams each showing a modification to the control section shown in FIG. 8.

DESCRIPTION OF THE PREFERRED EMBODIMENTS

While the position control system for a wheeled vehicle of the present invention is susceptible of numerous physical embodiments, depending upon the environment and requirements of use, substantial numbers of the herein shown and described embodiments have been made, tested and used, and all have performed in an eminently satisfactory manner.

Figure 1:
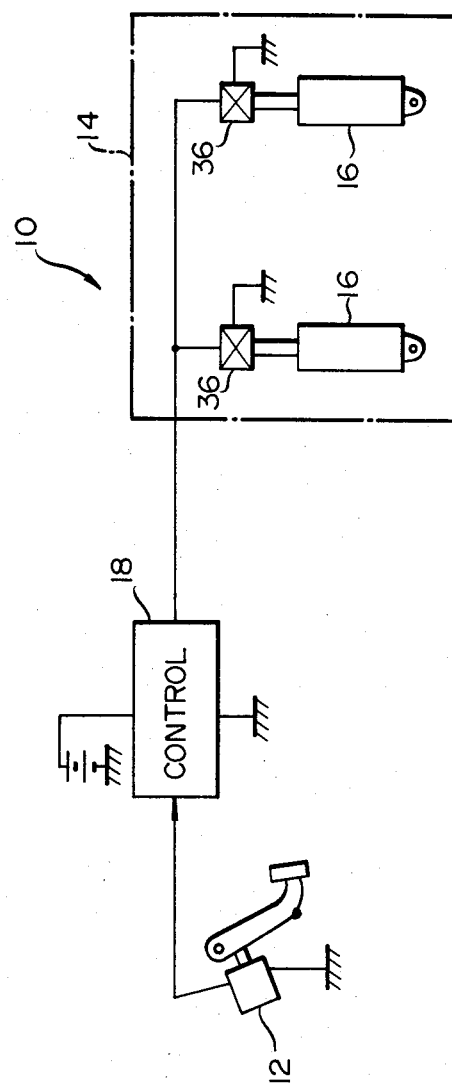
FIG. 1 is a schematic diagram of a position control system embodying the present invention.

Referring to FIG. 1 of the drawings, a position control system embodying the present invention is shown and generally designated by the reference numeral 10. The system 10 comprises a section 12 for sensing the varying operating condition of a wheeled vehicle in which the system is installed, a section 14 for driving hydraulic suspension unit 16 located between the vehicle body and axles to serve as shock absorbing units, and a section 18 for controlling the drive section 14 in response to an output signal of the sensor section 12.

Figure 2:
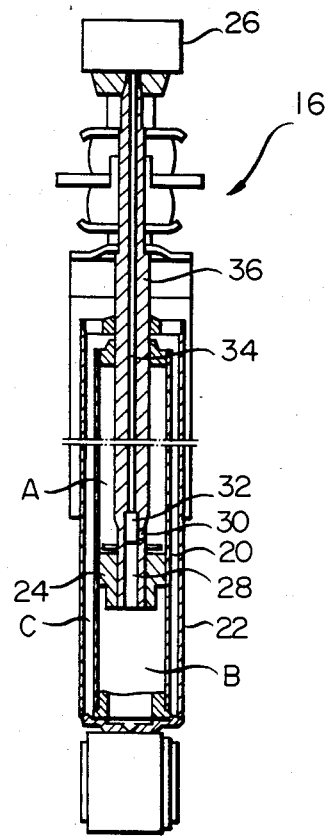
FIG. 2 is a section of a hydraulic suspension unit which is controlled by the system of FIG. 1.
Figure 7:
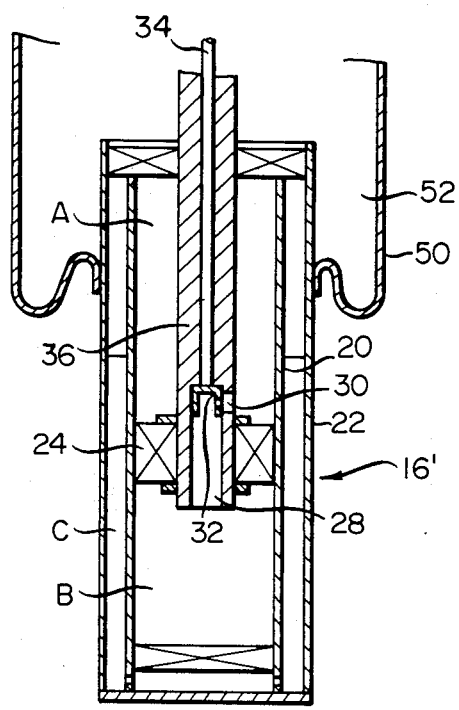
FIG. 7 is a section of a hydraulic suspension unit controlled by the system of FIG. 6.

As shown in detail in FIG. 2, each suspension unit or shock absorber 16 includes an inner tube 20 and an outer tube 22 disposed around the inner tube 20. A piston 24 is received in the inner tube 20 to be slidable up and down therealong, defining a fluid chamber A thereabove and a fluid chamber B therebelow. The inner tube 20 and outer tube 22 cooperate to define an annular fluid chamber C therebetween. A piston rod 26 extending upwardly from the piston 24 is connected to the vehicle body, while the outer tube 22 is connected to the axle.

Although not shown in FIG. 2, the piston 24 carries therewith an expansion damping valve and a compression damping valve. During a compression stroke of the piston rod 26 into the inner tube 20, hydraulic fluid is forced out of the narrowing lower chamber B into the widening upper chamber A via the compression damping valve. The damping valve, exerting a predetermined resistance to the flow of the fluid, generates a compression damping force. At the same time, excessive part of the fluid corresponding to a volume of the piston rod 26 moved into the inner tube 20 is admitted into the annular chamber C. During an expansion stroke of the piston rod 26 out of the inner tube 20, the fluid is returned from the upper chamber A to the lower chamber B via the expansion damping valve thereby generating a damping force in the same manner as in the compression stroke.

The suspension unit 16 also includes a damping force regulation mechanism which selectively provides fluid communication between the upper and lower chambers A and B bypassing the valves carried by the piston 24. The mechanism comprises an axial passageway 28 extending throughout the piston 24 and piston rod 26, a radial passageway 30 formed through part of the piston rod 26 which defines the axial passageway 28, and a valve member 32 disposed in the passageway 28 to selectively communicate it to the passageway 30. The valve 32 is rigidly connected to a control rod 34 which extends axially throughout the piston rod 26. Rotation of the control rod 34 will cause the valve 32 to rotate to thereby communicate or discommunicate the passageway 28 to or from the passageway 30.

A rotary solenoid 36 is mounted on the upper end of the piston rod 26 in order to drive the control rod 34 in an angular movement for the purpose described above. When the passageways 28 and 30 are isolated from each other, the resulting damping force will be larger than when they are communicated to each other. During an operation of the vehicle under a nose-dive or squat condition and for a predetermined short period of time after such a condition is terminated, the rotary solenoid 36 will be continuously energized by an output signal of the control section 18 thereby fluidly isolating the passageway 28 from the passageway 30. Here, an increase in the damping force of at least front wheel suspension units will suffice the prevention of nose-diving and an increase in the damping force of at least rear wheel suspension units, the prevention of squatting.

Figure 3:
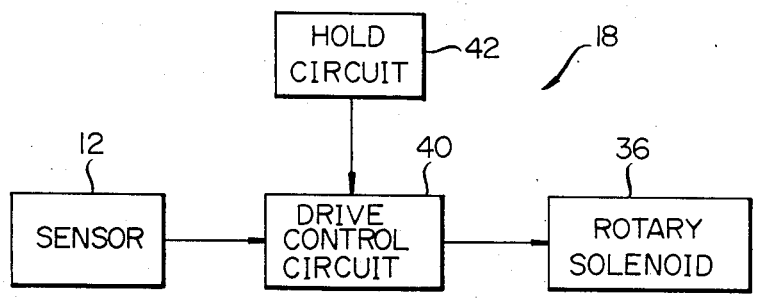
FIG. 3 is a block diagram of a control section included in the system of FIG. 1.

As shown in FIG. 3, the control section 18 comprises a drive control circuit 40 for energizing the rotary solenoid 36 of each suspension unit 16 in response to an output signal of the sensor section 12, and a hold circuit 42 for holding the operative state of the drive control circuit 40 over a predetermined period of time.

Figure 4:
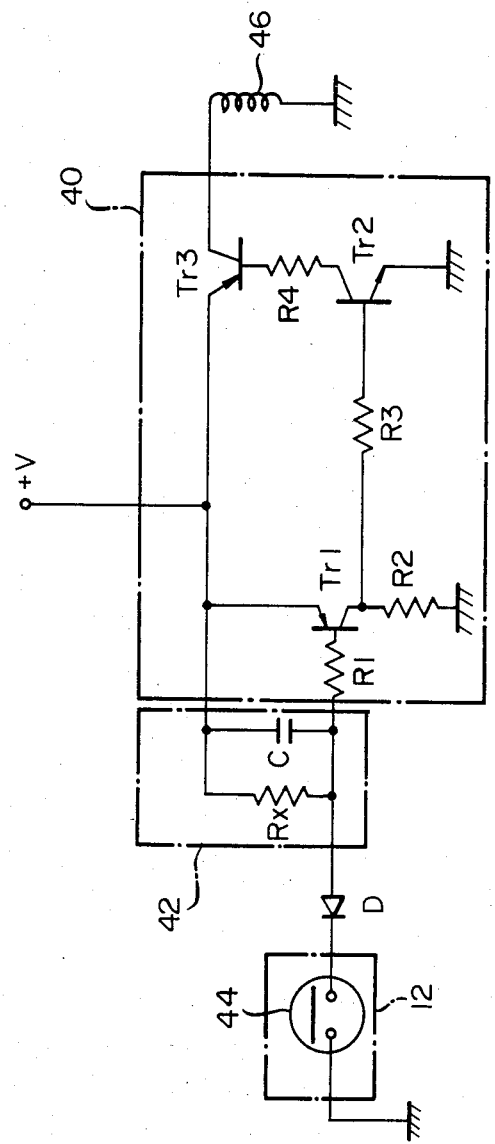
FIG. 4 is a circuit diagram showing a practical example of the control section shown in FIG. 3.

A practical example of the control section 18 is shown in FIG. 4. The drive control 40 comprises transistor $Tr_1$, $Tr_2$ and $Tr_3$, resistors $R_1$, $R_2$, $R_3$ and a diode D. The hold circuit 42, on the other hand, comprises a resistor Rx and a capacitor C. The sensor 12 comprises a switch 44 which may be operatively associated with a brake pedal of the vehicle when the object of the control is nose-diving and with an accelerator pedal when it is squatting. Such switches 44 may of course be individually interlocked with the brake pedal and accelerator pedal in order to sense and control both the nose-diving and squatting.

In FIG. 4, when the sensor switch 44 is closed, the capacitor C becomes charged and the transistor $Tr_1$ becomes conductive. This increases the base potential of the transistor $Tr_2$ to make it conductive so that the amplifying transistor $Tr_3$ is turned on to supply a current to a coil 46 of the rotary solenoid 36. Meanwhile, when the sensor switch 44 is opened, the capacitor C releases its charge or is discharged through the resistor Rx while maintaining the transistor $Tr_1$ conductive, whereby the coil 46 is kept energized. Upon the lapse of a given time determined by the time constant of the resistor Rx and capacitor C (e.g. 2-3 seconds), the transistor $Tr_1$ is turned off to deenergized the coil 46.

Hereinafter will be described the operation of the position control system 10 with the control section 18 shown in FIG. 4.

Suppose that the vehicle is under a normal operating condition and that the sensor switch 44 (associated with the brake pedal in this embodiment) is open. Under this condition, the rotary solenoid 36 remains deactivated to keep the valve 32 (FIG. 2) in a position for communicating the passageways 28 and 30 to each other. Therefore, the damping force exerted by the shock absorber 18 is small enough to insure a soft comfortable ride. As soon as the brake pedal is depressed to brake the vehicle, the sensor switch 44 is closed to energize the coil 46 via the transistor $Tr_3$. This activates the rotary solenoid 36 to interrupt the communication between the passageways 28 and 30 through the valve 32. As a result, a temporary increase occurs in the damping force of at least each front wheel suspension unit 16 so that the vehicle body is prevented or substantially prevented from diving forward, When the brake pedal is released, the sensor switch 44 is opened. However, the hold circuit 42 maintains the coil 46 in the energized state for some time even after the brake release and thereby keeps the damping force at the higher magnitude in that while. The vehicle body, therefore, is prevented from jolting backward due to inertia at the instant of brake release.

While the operation of the system has been described in conjunction with nose-diving which originates from braking, it will be seen that the principle of operation applies to a squatting situation as well. When the sensor switch 44 (associated with the accelerator pedal this time) is closed in response to an abrupt start of the vehicle, the damping force is increased a moment at least in the rear wheel suspension unit 16 thereby effectively suppressing a squat of the vehicle body. Again, the hold circuit 42 functions to maintain the damping force at the higher magnitude so that a forward jolt of the vehicle body due to inertia is eliminated. The condition for the acceleration sensor switch 44 to be closed is either that the opening degree of a throttle valve be larger than a predetermined value or that the throttle opening speed be higher than a predetermined value.

Figure 5:
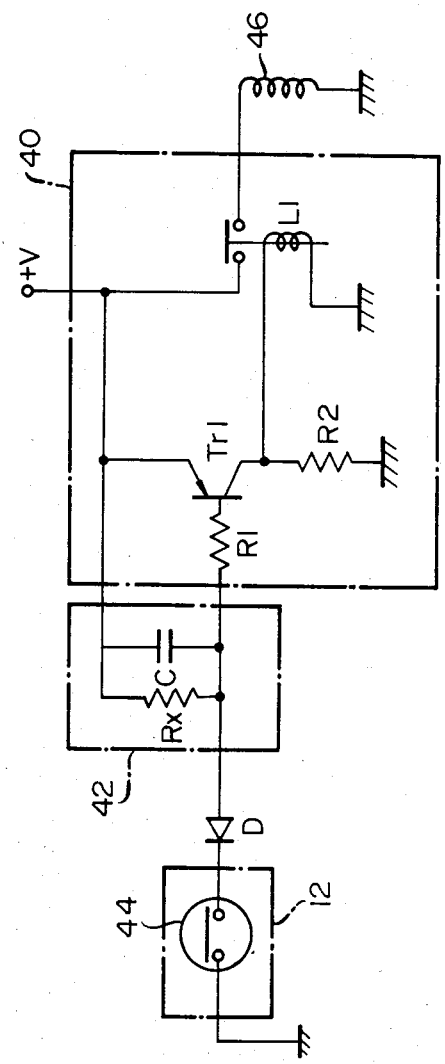
FIG. 5 is a circuit diagram of a modification to the control section of FIG. 4.

A modification to the control section 18 shown in FIG. 4 is depicted in FIG. 5. As shown, the drive control 40 of FIG. 5 employs a relay L₁ in place of the transistors Tr₂ and Tr₃ installed in the drive control of FIG. 4.

Referring to FIGS. 6-11, another embodiment of the system of the present invention is shown. In FIGS. 6-11, structural elements common to those of the first embodiment shown in FIGS. 1-5 are designated by the same reference numerals and the description thereof will be omitted for simplicity.

The construction which will be described is particularly designed to suppress rolling of the vehicle body while the vehicle body is clearing a turn. Generally, the system in accordance with the second embodiment is similar to that of the first concerning the provision of the sensor section 12 sensitive to an operating condition of the vehicle, drive section 14 for driving hydraulic suspension units 16' (see FIG. 7), and control section 18 for controlling the drive section 14.

Figure 6:
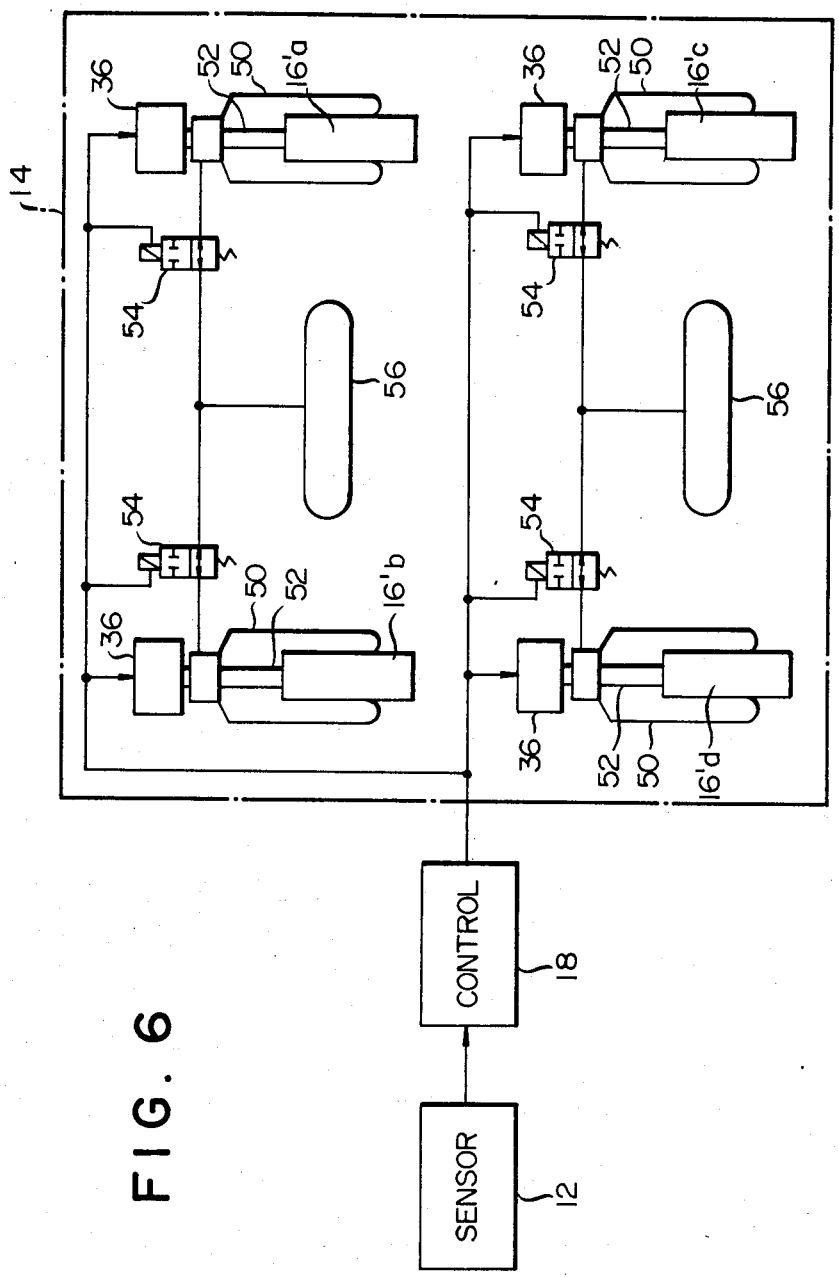
FIG. 6 is a diagram of another embodiment of the present invention.

As shown in FIG. 6, the drive section 14 is adapted to drive two front wheel suspension units 16'a and 16'b and two rear wheel suspension units 16'c and 16'd, four in total. It will be seen from FIG. 7 that each of the suspension unit 16' is substantially the same in construction as the suspension unit 16 of FIG. 2 except for an air spring chamber 52 which is defined by a rubber sleeve 50. The rotary solenoid 36 associated with each suspension unit 16' is operable to control the damping force of the suspension unit in two selective stages, high and low. Also, solenoid-operated valves 54 are installed in the drive section 14 one for each suspension unit 16' so that they may be actuated to selectively communicate the air spring chambers 52 of their associated suspension units 16' to an air accumulator 56 and thereby vary the spring constants thereof. In detail, as long as the right and left air spring chambers 52 are communicated to each other and to the accumulator 56, the air spring constant is relatively small and the non-linearity of the spring load relative to the stroke of each suspension unit 16' is insignificant. Conversely, when the valves 54 are actuated to fluidly isolate the right and left air spring chambers 52 from each other and from the accumulator 56, the effective capacity of each chamber 52 undergoes a substantial change to intensify the non-linearity of the spring constant and thereby sharply increase the spring constant against a short stroke of the suspension unit 16'.

Figure 8:
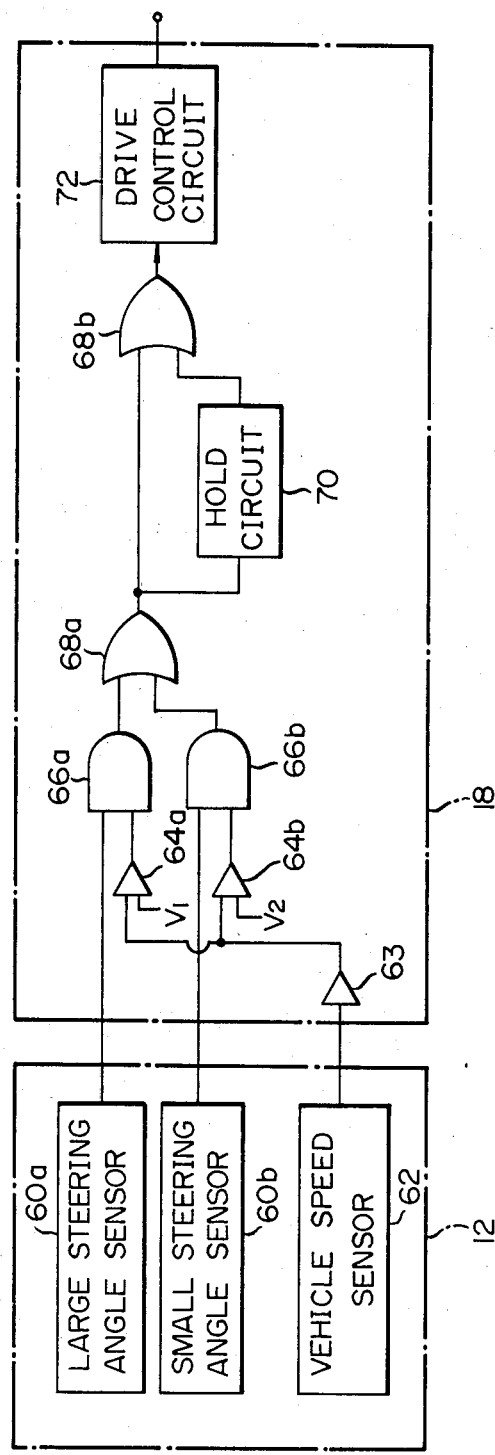
FIG. 8 is a block diagram of a control section included in the system of FIG. 6.

Referring to FIG. 8, practical examples of the sensor section 12 and control section 18 shown in FIG. 6 are illustrated. A transverse acceleration which will cause the vehicle body to roll during a turn is dependent on, for example, the relationship between a steering angle and a vehicle speed. Typically, such a magnitude of transverse acceleration will develop when the vehicle speed is high even if the steering angle is small or when the steering angle is large even if the vehicle speed is low. With this in view, the sensor section 12 shown in FIG. 8 comprises a sensor 60a sensitive to large steering angles, a sensor 60b sensitive to small steering angles, and a vehicle speed sensor 62. The control section 18, on the other hand, comprises a comparator network made up of an inverter 63, comparators 64a and 64b, AND gates 66a and 66b and OR gates 68a and 68b, a hold circuit 70 including a monostable multivibrator, and a drive control circuit 72.

The vehicle speed sensor 62 delivers a signal indicative of a vehicle speed to one input terminal of the comparators 64a and 64b via the inverter 63. Reference voltages V₁ and V₂ corresponding to a low vehicle speed and a high vehicle speed, respectively, are supplied to the other input terminal of the comparators 64a and 64b. As the voltage signal representing an actual vehicle speed becomes higher than any one of the reference voltages V₁ and V₂, the output of the associated comparator is made high level. The AND gate 66a is supplied with an output of the steering angle sensor 60a at one input terminal and an output of the comparator 64a at the other input terminal. Likewise, the AND gate 66b is supplied with an output of the steering angle sensor 60b at one input terminal and an output of the comparator 64b at the other input terminal. The output of each AND gate 66a or 66b becomes high level when both its inputs are high level. The OR gate 68a produces a signal indicative to rolling or, as will be referred to, a rolling signal when any one of the outputs of the AND gates 66a and 66b is made high level.

The rolling signal output from the OR gate 68a is fed to one input terminal of the OR gate 68b and to the hold circuit 70. The hold circuit 70 is triggered by the trailing edge of the rolling signal to supply the other input terminal of the OR gate 68b with a pulse having a predetermined duration. The duration of this pulse is predetermined to be long enough to prevent the vehicle body from rolling back in the other direction immediately after a turn, e.g. 2-3 seconds. While any one of the inputs to the OR gate 68b is kept high level, the OR gate 68b delivers a high level signal to the drive control 72 which will activate the rotary solenoid 36 and valves 54.

The system in accordance with the second embodiment described above and having the control section 18 of FIG. 8 will be operated as follows when the vehicle makes a turn.

When the steering wheel of the vehicle is moved over a small angle, the vehicle will not roll unless the vehicle speed is fairly high at that time. The rolling will not occur, either, when the vehicle speed is low even if the steering angle is large. In these situations, neither the output of the AND gate 66a nor that of the AND gate 66b becomes high level so that the delivery of a rolling signal from the OR gate 68a to the drive control 72 is inhibited. Therefore, the rotary solenoid 36 of each suspension unit remains deenergized to keep the damping force uncontrolled, that is, the valve 32 is held in a position for intercommunicating the passageways 28 and 30 and thereby for generating a small damping force with importance attached to a comfortable ride. In the meantime, the air spring chambers 52 of the right suspension units 16'a and 16'c are individually communicated to those of the left suspension units 16'b and 16'd via the associated valves 54, while all the chambers 52 are individually communicated to the air accumulators 56. Under this condition, the spring constant of each air spring remains small to offer vehicle occupants comfortable feeling.

When the transverse acceleration exceeds a predetermined value to make either one of the outputs of the AND gates 66a and 66b high level, the OR gate 68a produces a rolling signal. This applies, for example, to a situation wherein only the comparator 64a makes its output high level in a low vehicle speed range and the output of the sensor 60a is made high level in response to a large steering angle, and a situation wherein the comparator 64b makes its output high level in a high vehicle speed range even if the steering angle is not more than a magnitude which turns on the sensor 60*b* only. The rolling signal from the OR gate 68*a* is gated through the OR gate 68*b* into the drive control 72 thereby energizing the rotary solenoid 36 and valve 54 associated with each suspension unit 16'. Then, the valve 32 of the suspension unit 16' discommunicates the passageways 28 and 30 from each other to increase the damping force. Simultaneously, the communication of the associated right and left air spring chambers 52 is interrupted resulting in a larger spring constant. In this manner, the suspension units 16'*a*–16'*d* prevent the vehicle body from tilting right and left to thereby insure a stable position of the vehicle body even during a turn. It will be noted that in practice the outer shock absorbers with respect to a turn serve to prevent the vehicle body from being lowered.

As the transverse acceleration is reduced beyond the predetermined value, the rolling signal from the OR gate 68*a* disappears so that the hold circuit 70 supplies the OR gate 68*b* with a pulse whose duration may be 2–3 seconds, for example. This pulse is gated through the OR gate 68*b* into the drive control 72 to cause the latter to keep on actuating the rotary solenoids 36 and valves 54. This constitutes an effective measure against rolling-back of the vehicle body in the other direction which would otherwise occur immediately after a turn due to the inertia energy accumulated in the vehicle body.

Figure 9:
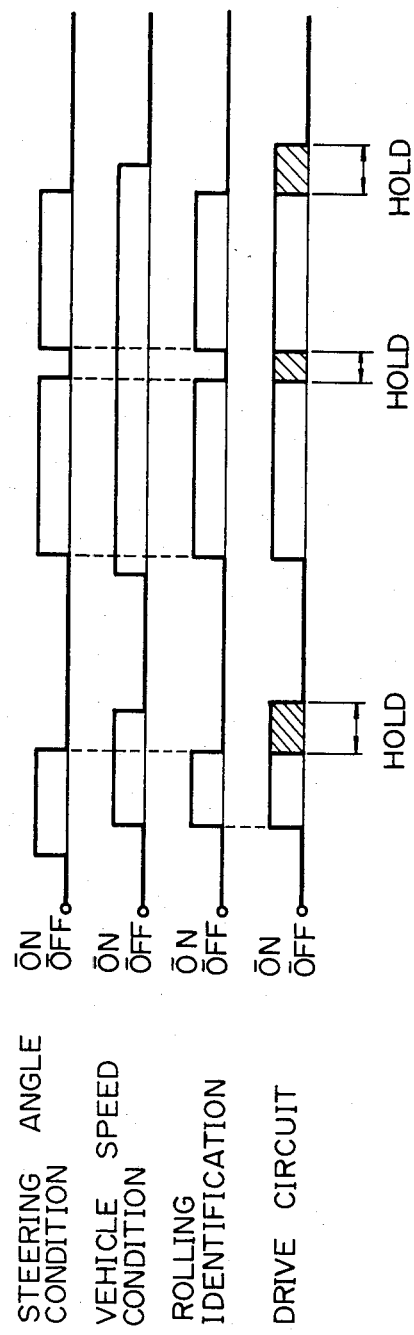
FIG. 9 is a timing chart demonstrating the operation of the control section shown in FIG. 8.

The operation described above will be more clearly understood from the timing chart shown in FIG. 9. When rolling signals appear successively at relatively short intervals, the hold circuit 70 function to maintain the larger damping force and spring constant. Therefore, the situation tending to cause the vehicle body to roll repeatedly is coped with by the continuous hard suspension and thereby increased stability of operation.

Alternative constructions of the sensor section 12 and control section 18 shown in FIG. 6 will be described with reference to FIGS. 10 and 11.

The circuitry shown in FIG. 10 is designed to identify a rolling condition based on a steering angle $\theta$ and a square of a vehicle speed, $v^2$. The output of the steering angle sensor 60 is amplified by an amplifier 80 ($\theta$) and fed to one input terminal of a multiplier 82. The output of the vehicle speed sensor 62, which may comprise a crank angle sensor, is fed to a frequency-to-voltage (F/V) converter 84 to be converted into an analog voltage proportional to its frequency. The analog voltage is amplified by amplifiers 86 and 88 and then multiplied by a multiplier 90 ($v^2$). The output $v^2$ of the multiplier 90 is amplified by an amplifier 92 and fed to the other input terminal of the multiplier 82. Processing the two inputs, the multiplier 82 delivers a product $\theta \cdot v^2$ to a comparator 94. When the product is larger than a reference value, the comparator 94 supplies a hold circuit 96 and a drive control circuit 98 with a rolling signal.

Meanwhile, the circuitry of FIG. 11 is constructed to identify a rolling condition based on a relationship between a steering angular velocity $\dot{\theta}$ and a vehicle speed v. The output of the steering angle sensor 60 is differentiated by a differentiator 100 ($\dot{\theta}$) and then amplified by amplifier 102 ($a\dot{\theta}$). The output of the vehicle speed sensor 62 is processed by a frequency-to-voltage (F/V) converter 104 into an analog voltage which is then amplified by an amplifier 106 (bv). The outputs of the amplifiers 102 and 106 are supplied to a differential amplifier 108. The output voltage of the amplifier 108, ($a\dot{\theta}$- bv), is compared with a reference voltage by the comparator 94 and, if it is higher than the latter, the comparator 94 delivers a rolling signal to the hold circuit 96 and drive control 98.

It is generally accepted that the steering angular velocity $\dot{\theta}$ tends to decrease as the vehicle speed v increases for a given transverse acceleration. Therefore, the difference ($a\dot{\theta}$- bv) will become larger than the reference value and the vehicle will roll in response to an increase in the transverse acceleration beyond a certain value. Thus, a rolling signal will be delivered in such a condition as in the case mentioned.

In summary, it will be seen that a position control system for a wheeled vehicle of the present invention controls hydraulic suspension units of the vehicle to increase the available damping force and spring constant as soon as an operating condition causative of nose-diving, squatting or rolling is detected, thereby preventing the vehicle body from tossing under such an operating condition. Additionally, because this control is continued for some time even after the undesirable condition concerned is settled, the vehicle body is free from jolting-back due to the force of inertia stored in the vehicle body. This will contribute a great deal to the improvement in operationablity and stability.

Various modifications will become possible for those skilled in the art after receiving the teachings of the present disclosure without departing from the scope thereof. For example, while in the second embodiment both the suspension units and air springs are controlled in response to a rolling signal, the control may be effected on only the suspension units or the air springs. Further, the suspension unit of FIG. 2 is applicable to the second embodiment of FIG. 6 and the suspension unit of FIG. 7 to the first embodiment of FIG. 1.

What is claimed is:

1. A system for controlling the position of a wheeled vehicle which includes suspension means for damping shock while the vehicle is running, said system comprising:

vehicle position sensor means for sensing a change in the position of the vehicle from a usual position to an unusual position and producing a signal indicative of said unusual position;

damping force regulator means for regulating the shock damping force exerted by the suspension means;

control means comprising a drive control circuit for controlling said damping force regulator means in response to the output signal of the vehicle position sensor means to increase the shock damping force; and hold means for holding the drive control circuit of the control means to maintain the increased condition of the shock damping force of the damping force regulator means for a predetermined period of time after the vehicle position sensor means produces the signal indicating that the vehicle regains the usual position, such that the shock damping force is maintained at the increased condition.

2. A system as claimed in claim 1, which the suspension means comprises a hydraulic suspension unit mounted between the body of the vehicle and a wheel of the vehicle.

3. A system as claimed in claim 2, in which at least one hydraulic suspension unit is associated with each of the front wheels, and at least one hydraulic suspension unit is associated with each of the rear wheels.

4. A system as claimed in claim 3, in which the sensor means comprises a brake sensor switch for sensing the position of the vehicle caused by application of the brake of the vehicle and outputting a brake signal indicative of said vehicle position, the control means, in response to the brake signal, being operable to drive the damping force regulator means to increase the shock damping force of the suspension units associated with the front wheels of the vehicle.

5. A system as claimed in claim 3, in which the sensor means comprises an acceleration sensor switch for sensing the position of the vehicle caused by start of travel of the vehicle and generating an acceleration signal indicative of said vehicle position, the control means, in response to the acceleration signal, being operable to drive the damping force regulator means to increase the shock damping force of the suspension units associated with the rear wheels of the vehicle.

6. A system as claimed in claim 2, in which there is at least one hydraulic suspension unit allocated to each of the wheels of the vehicle.

7. A system as claimed in claim 6, in which the sensor means comprises a vehicle speed sensor for sensing the vehicle speed and generating a signal indicative of vehicle speed and a steering angle sensor for sensing the steering angle of the vehicle and generating a signal indicative of the steering angle, the control means comprising a computing circuit for producing a rolling signal when said computing circuit computes, in response to the vehicle speed signal and the steering angle signal, a position of the vehicle resulting from a turn of the vehicle.

8. A system as claimed in claim 1, in which the hold means comprises a parallel connection of a resistor and a capacitor which holds the drive control circuit.

9. A system as claimed in claim 1, in which the hold means comprises a monostable multrivibrator which holds the drive control circuit.

10. A system for controlling the position of a wheeled vehicle which includes suspension means for exerting a shock damping force when said vehicle is in motion, said system comprising:
vehicle position sensor means for sensing a change in the position of the vehicle from a usual position to an unusual position and producing a signal indicative of said usual position and a signal indicative of said unusual position;
damping force regulator means for regulating the shock damping force exerted by the suspension means;
control means comprising a drive control circuit for controlling said samping force regulator means in response to the unusual position output signal of the vehicle position sensor means to increase the shock damping force; and
hold means for holding the drive control circuit of the control means to maintain the increased condition of the shock damping force of the damping force regulator means for a predetermined period of time after the vehicle position sensor means produces the usual position signal indicating that the vehicle regained the usual position, whereby the vehicle is prevented from tossing back due to the force of inertia.

11. A system as claimed in claim 10, in which said suspension means comprises a hydraulic suspension unit mounted between the vehicle body and each of the two front wheels, said sensor means comprising a brake sensor for sensing the position of the vehicle caused by application of the brake of the vehicle and outputting a brake signal indicative of said vehicle position, said damping force regulator means comprising front wheel damping force regulator devices operable to regulate the shock damping force exerted by the hydraulic suspension units associated with said front wheels, said control means being operable to control said front wheel damping force regulator devices in response to said brake signal to increase the shock damping force of the suspension unit associated with the front wheels, whereby the vehicle is prevented from nose-diving during braking of the vehicle and also prevented from tossing back due to the force of inertia.

12. A system as claimed in claim 10, in which said suspension means comprises a hydraulic suspension unit mounted between the vehicle body and each of the rear wheels of the vehicle, said sensor means comprising an acceleration switch for sensing the position of the vehicle caused by the start of travel of the vehicle and generating an acceleration signal indicative of said vehicle position, said damping force regulator means comprising rear wheel damping force regulator devices operable to regulate the shock damping force exerted by the hydraulic suspension units associated with said rear wheels, said cbntrol means being operable to control said rear wheel damping force regulator devices in response to said acceleration signal to increase the shock damping force of the suspension unit associated with the rear wheels, whereby the vehicle is prevented from squatting during sudden acceleration of the vehicle and also prevented from tossing back due to the force of inertia.

13. A system as claimed in claim 10, in which the sensor means comprises a vehicle speed sensor for sensing the vehicle speed and generating a vehicle speed signal indicative of the vehicle speed and a steering angle sensor for sensing the steering angle of the vehicle and generating a steering angle signal indicative of the steering angle, said control means comprising a computing circuit operable to receive said vehicle speed signal and said steering angle signal and produce a rolling signal indicating a rolling condition of the vehicle resulting from the turning of the vehicle.

14. A system as claimed in claim 10, in which said suspension means comprises first hydraulic suspension units mounted between the body of the vehicle and the front and rear wheels on one side of the vehicle and second hydraulic suspension units mounted between the body of the vehicle and the front and rear wheels on the other side of the vehicle, said control means being operable to control said damping force regulator means in response to said rolling signal to increase the shock damping force of the first and the second hydraulic suspension units depending on which direction the vehicle turns, whereby the vehicle is prevented from rolling during turning of the vehicle and also prevented from rolling back due to the force of inertia.

* * * * *